(12) United States Patent
Neuner

(10) Patent No.: US 6,604,885 B1
(45) Date of Patent: Aug. 12, 2003

(54) TORQUE TRANSMITTER CONNECTION ASSEMBLY

(75) Inventor: Josef Neuner, Raublind (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/568,581

(22) Filed: May 11, 2000

Related U.S. Application Data

(63) Continuation-in-part of application No. 09/168,872, filed on Oct. 9, 1998, now abandoned.

(30) Foreign Application Priority Data

Oct. 30, 1997 (DE) .......................................... 197 47 962

(51) Int. Cl.[7] .............................................. F16D 33/00
(52) U.S. Cl. ..................... 403/359.2; 403/350; 60/330; 29/889.22
(58) Field of Search ........................... 403/359.2, 359.6, 403/359.1, 350; 60/330; 29/889.21, 889.22

(56) References Cited

U.S. PATENT DOCUMENTS

| | | |
|---|---|---|
| 1,136,557 A | 4/1915 | Ross |
| 1,381,805 A | 6/1921 | Crewdson |
| 2,297,390 A | 9/1942 | Burger |
| 3,845,622 A | 11/1974 | Hufstader |
| 5,129,493 A * | 7/1992 | Edmunds .................. 192/3.29 |
| 5,822,987 A | 10/1998 | Tsukamoto et al. |

FOREIGN PATENT DOCUMENTS

| | | |
|---|---|---|
| DE | GM1903818 | 11/1964 |
| DE | 1780276 | 12/1971 |
| DE | 2721571 | 11/1977 |
| DE | 3718410 A1 | 12/1987 |
| DE | 9116324.2 | 10/1992 |
| DE | 19522869 A1 | 1/1997 |
| JP | 58-211018 | 12/1983 |
| JP | 58-211019 | 12/1983 |

OTHER PUBLICATIONS

Patent Abstracts of Japan, JP07127693A, May 16, 1995, "Drive Transmission Mechanism."

Heinz Linke, "Stirnradverzahnung," Carl Hanser Verlag Muenchen Wien, Jan. 2, 1997, pp. 273–280.

* cited by examiner

*Primary Examiner*—Lynne H. Browne
*Assistant Examiner*—David E. Bochna
(74) *Attorney, Agent, or Firm*—Crowell & Moring LLP

(57) ABSTRACT

An assembly including a driving connection for torque transmission in a drive train of an engine by means of a shaft-hub connection. The shaft-hub connection is provided with lengthwise teeth for releasable connection of a crankshaft with a coaxial hydrodynamic torque converter. The lengthwise teeth of the shaft-hub connection have tooth cross sections that increase or decrease in the lengthwise direction of the teeth.

14 Claims, 2 Drawing Sheets

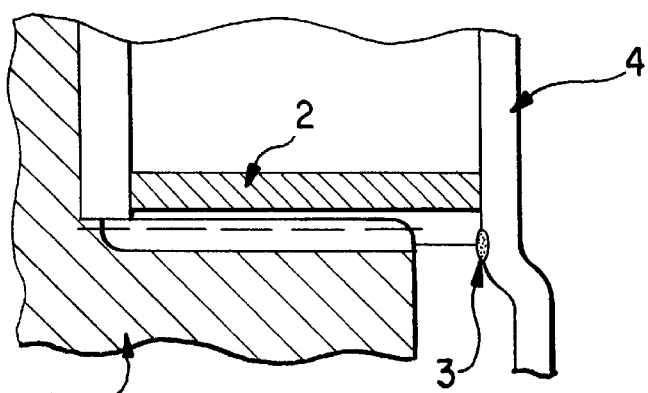
Fig. 1
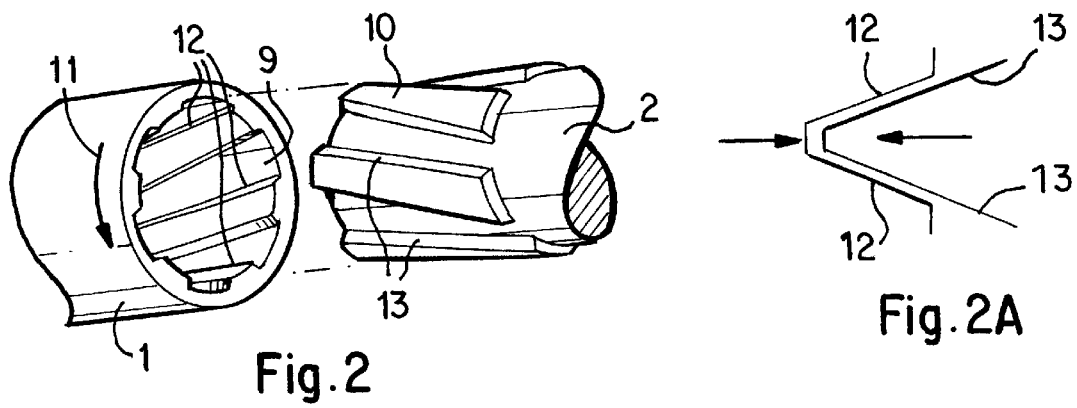
Fig. 2
Fig. 2A
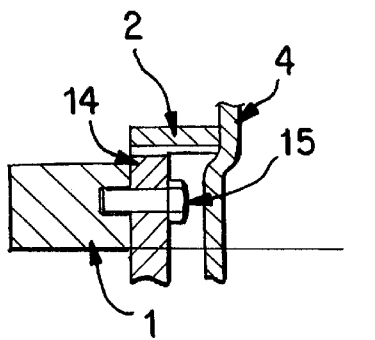
Fig. 3
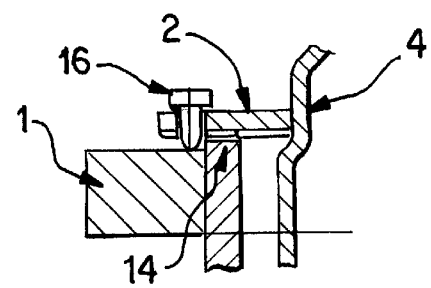
Fig. 4
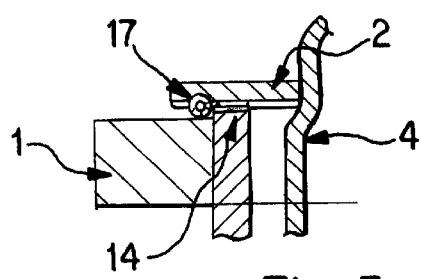
Fig. 5

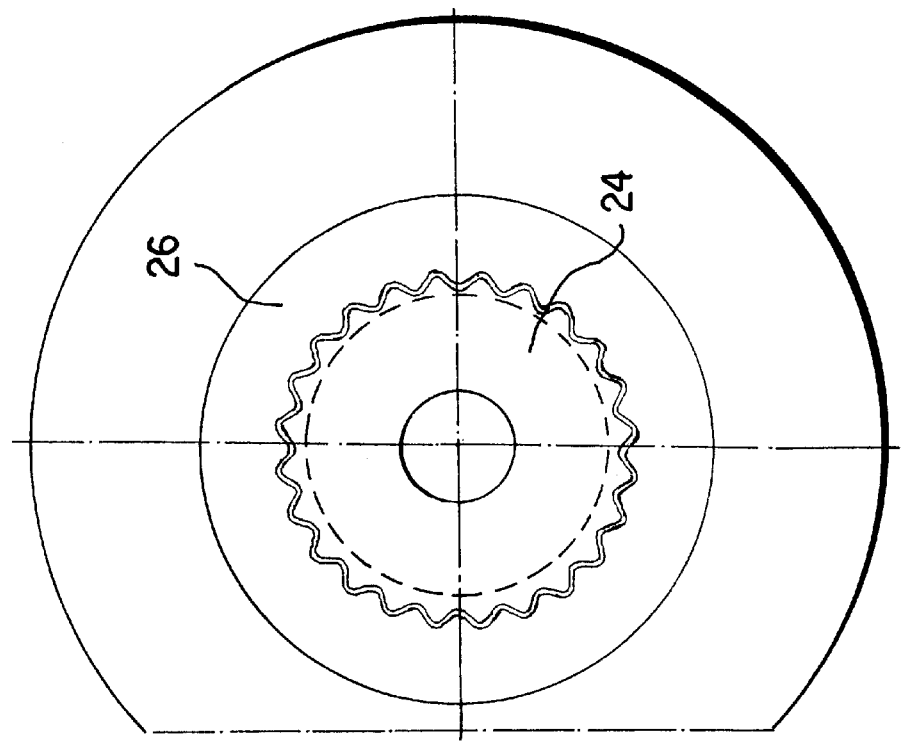
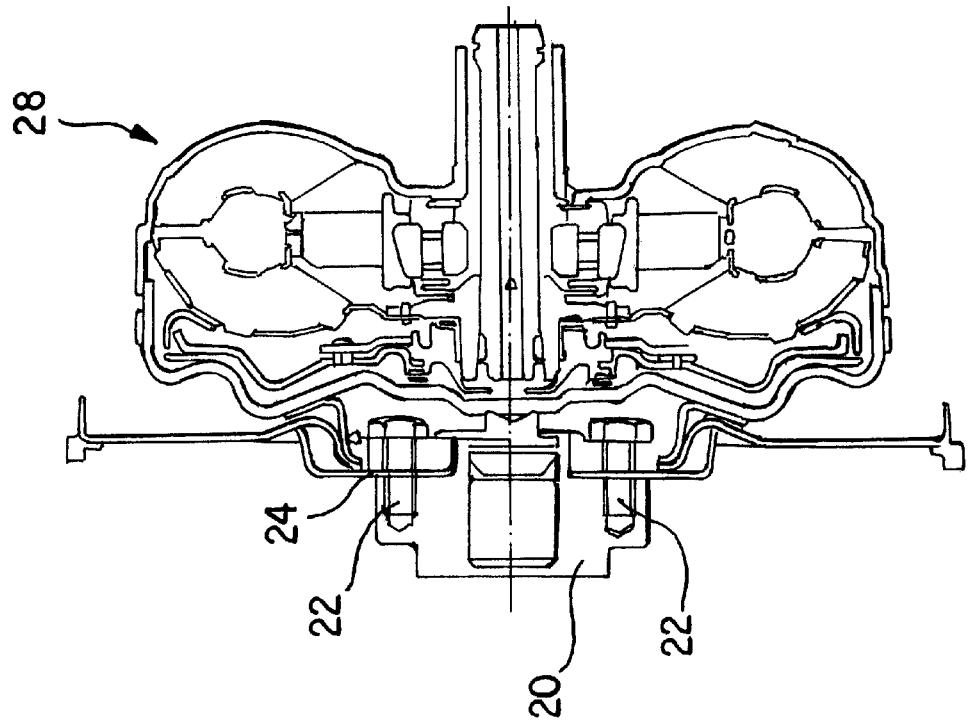
Fig.7
Fig.6

TORQUE TRANSMITTER CONNECTION ASSEMBLY

This application is a continuation-in-part of application Ser. No. 09/168,872 filed Oct. 9, 1998, now abandoned.

BACKGROUND AND SUMMARY OF THE INVENTION

This application claims the priority of German Patent Application No. 197 47 962.6, filed Oct. 30, 1997, the disclosure of which is expressly incorporated by reference herein.

The invention relates to a torque converter connection to a crankshaft in the drive train of a motor vehicle using a shaft-hub connection provided with lengthwise teeth for releasable connection of a crankshaft with a coaxial hydrodynamic torque converter.

It is already known to connect a torque converter to a crankshaft through a clutch disk. German Patent Document DE 195 22 869 A1 describes such a clutch disk, so designed that the connecting bolts between the clutch disk and the torque converter extend in the radial direction for easier assembly.

A connection between the crankshaft and the torque converter by means of a clutch disk basically requires costly assembly work.

It is already known to use a splined connection for transmitting torque. German Patent Document DE 699916 and U.S. Pat. No. 2,297,390 describe such a splined connection used in propeller driving shafts. The splined connection disclosed in these documents is so designed to transmit torque while transmitting stresses in an axial direction.

However, such a splined connection as disclosed in Germany Patent Document DE 699916 and U.S. Pat. No. 2,297,390 has not been previously used to provide a connection between a torque convertor and a crankshaft of an engine.

Hence, an object of the invention is to provide a releasable connection between a torque converter and a crankshaft, which can be installed simply and is free of play at least during torque conversion.

This object is achieved according to the invention by providing an arrangement in a torque converter wherein the lengthwise teeth of the shaft-hub connection have tooth cross sections that increase or decrease in the lengthwise direction of the teeth.

According to the invention, a drive connection for torque transmission is provided in the drive train of an engine, such as in a motor vehicle, by a shaft-hub connection provided with lengthwise teeth for releasable connection of a crankshaft with a coaxial hydrodynamic torque converter, with the lengthwise teeth of the shaft-hub connection having tooth cross sections that increase or decrease in the lengthwise direction of the teeth.

Lengthwise toothing with an axially conical tooth shape of this kind on the shaft and hub has the advantage that freedom from play results from axial pretensioning. In addition, a connection between a crankshaft and a coaxial hydrodynamic torque converter is simple to provide by using such a shaft-hub connection. For this purpose, the crankshaft and torque converter need only be pushed together in the axial direction so that the lengthwise teeth of the shaft and hub mesh with one another.

In a preferred embodiment of the invention, the hub and shaft with lengthwise teeth are mounted on the torque converter and the corresponding element of the shaft-hub connection is mounted on the crankshaft.

This has the advantage that the torque-transmitting connection between the crankshaft and the torque converter consists of very few parts that can be assembled at low assembly cost.

This advantage is even more important in another preferred embodiment of the invention in which the shaft and/or hub with lengthwise teeth is made integral with the crankshaft.

In one advantageous embodiment of the invention, an axial force is used for axially securing the shaft-hub connection, said force resulting from converter internal pressure during the operation of the converter.

A design of this kind has the advantage that no further measures need be taken for axially securing the shaft-hub connection. The axial force in the direction of the crankshaft that results from the operation of the torque converter presses the conical lengthwise teeth into one another with zero play.

In addition, in another advantageous embodiment of the invention, the shaft and hub can be connected shapewise with one another for axially securing the shaft-hub connection.

This advantageously secures the connection between the crankshaft and the torque converter even when the torque converter is not operating and hence no internal pressure is present in the converter. Such shapewise connections between the shaft and the hub are achieved by known machine elements, for example by a tensioning spring provided in a circumferential groove of the hub or by bolts screwed into the hub in the radial direction and passing therethrough.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic partial sectional view which shows the connection of a crankshaft to a torque converter, constructed according to a preferred embodiment of the invention;

FIG. 2 is a perspective exploded view of the shaft-hub connection for connecting a crankshaft and a torque converter according to a preferred embodiment of the present invention;

FIG. 2A is a schematic view depicting the relationship of a set of teeth of the shaft-hub connection according to a preferred embodiment of the invention;

FIG. 3 is a sectional partial view showing another embodiment of the connection of a crankshaft to a torque converter according to a preferred embodiment of the invention;

FIG. 4 is schematic sectional partial view similar to FIG. 3, showing a connection of a crankshaft to a torque converter secured axially by means of a bolt, and FIG. 5 is a schematic sectional partial view similar to FIG. 3, showing an embodiment with additional axial securing provided by a tensioning spring.

FIG. 6 is a cross-sectional view illustrating an embodiment of an assembly showing a splined connection between a torque convertor and a crankshaft of an engine according to an preferred embodiment of the present invention.

FIG. 7 is a front view illustrating the assembly including the torque convertor and the splined connection of FIG. 6.

DETAILED DESCRIPTION OF THE DRAWINGS

FIG. 1 shows an end section of a crankshaft 1, designed as a shaft with lengthwise teeth, inserted into a driving flange 2 of a hydrodynamic torque converter, said flange being designed in the form of a hub with lengthwise teeth. Driving flange 2 is connected permanently with housing 4 of the torque converter by a welded seam 3. The lengthwise teeth on the shaft-hub connection have tooth cross sections that increase or decrease in the lengthwise direction of the teeth. Housing 4 is axially displaceable relative to crankshaft 1. For this reason, the internal pressure of the converter that is developed when the torque converter is operating displaces housing 4 together with driving flange 2 toward crankshaft 1 up to the shaft-hub connection and is free of play because of the increasing or decreasing tooth cross sections on the shaft and hub. This means that driving flange 2 is supported in the axial direction by crankshaft 1 by means of the lengthwise teeth.

FIG. 2 schematically shows the end of crankshaft 1 as a hub and driving flange 2 as a shaft, with internal teeth 9 on crankshaft 1 and external teeth 10 on driving flange 2. By pushing them together, crankshaft 1 and driving flange 2 are connected shapewise with one another. When crankshaft 1 turns in the direction indicated by arrow 11 and torque is transmitted from crankshaft 1 to driving flange 2, force is transmitted through flanks 12 whose pattern in this embodiment is chosen such that the parts connected with one another by the teeth automatically press against one another. FIG. 2A schematically depicts the relationship of one set of tooth flanks 12, 13. Because of the tooth cross sections which increase or decrease in the lengthwise direction of the teeth and because of the internal pressure of the converter that urges driving flange 2 axially toward crankshaft 1 (see arrows in FIG. 2A), freedom from play is established at the force-transmitting tooth flanks 12, 13 of the releasable driving connection. Even during load surges or fluctuations, assurance is provided by the axial force from the internal pressure of the converter and by the pattern of the lengthwise teeth that separation of tooth flanks 12 of crankshaft 1 and tooth flanks 13 of driving flange 2 will be prevented.

Independently of the design in FIG. 2, however, it is also possible for the lengthwise teeth of the shaft-hub connection, with tooth cross sections that increase or decrease in the lengthwise direction of the teeth, to extend exclusively in the axial direction. In this case, only the internal pressure of the converter produces freedom from play between tooth flanks 12 and tooth flanks 13. The situation is similar in another embodiment not shown, in which the lengthwise teeth are replaced by meshing wedge-shaped claws of endwise toothing. The wedge angle of the claws should then lie approximately in the range of the self-locking limit.

FIG. 3 shows another embodiment of the connection of crankshaft 1 to housing 4 of the torque converter. In this case driving flange 2 is designed as a hub while a tooth circle 14, mounted by bolts 15 to the end of crankshaft 1, corresponds to the shaft that forms the releasable driving connection with the hub.

FIG. 4 and FIG. 5 show driving connections between crankshaft 1 and housing 4 of the torque converter that correspond to FIG. 3, but with another shapewise connection between the shaft and the hub as an additional fastening device to maintain the connection in the axial direction.

In FIG. 4 a locking bolt 16 that passes through driving flange 2 in the radial direction grips behind tooth circle 14 of crankshaft 1. Thus, loosening of the driving connection in the axial direction is prevented in the event that no internal pressure from the converter is present.

In the embodiment that corresponds to FIG. 5, the same result is obtained by a tensioning spring 17 that fits behind tooth circle 14 of crankshaft 1. Tensioning spring 17 rests in a circumferential groove on driving flange 2, designed as a hub.

FIG. 6 shows an assembly including a driving connection between an engine crankshaft 20 and a coaxially disposed hydrodynamic torque convertor 28. Specifically, FIG. 6 shows the driving connection including an end section of the engine crankshaft 20 mounted by bolts 22 to a toothed drive plate 24, designed as the shaft, while a flanged portion 26 of the converter 28 with corresponding teeth, is designed as the hub. Similar to the previously discussed preferred embodiments illustrated in FIGS. 1 and 2, the lengthwise teeth on the shaft-hub connection of the assembly of FIG. 6 have tooth cross sections that increase or decrease in the lengthwise direction of the teeth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Driving connection for torque transmission in the drive train of a motor vehicle, using a shaft-hub connection provided with lengthwise teeth for releasable connection of a crankshaft with a coaxial hydrodynamic torque converter, wherein the lengthwise teeth of the shaft-hub connection have tooth cross sections that increase or decrease in the lengthwise direction of the teeth,
   wherein one of the hub and shaft with lengthwise teeth is mounted on the torque converter housing.

2. Driving connection according to claim 1, wherein the other of the shaft and hub with lengthwise teeth is mounted on the crankshaft.

3. Driving connection according to claim 2, wherein one of the shaft and hub with lengthwise teeth is made integral with the crankshaft.

4. Driving connection according to claim 3, wherein an axial force is used to secure the shaft-hub connection axially, said force resulting from the internal pressure of the converter when the torque converter is operating.

5. Driving connection according to claim 2, wherein an axial force is used to secure the shaft-hub connection axially, said force resulting from the internal pressure of the converter when the torque converter is operating.

6. Driving connection according to claim 1, wherein an axial force is used to secure the shaft-hub connection axially, said force resulting from the internal pressure of the converter when the torque converter is operating.

7. Driving connection for torque transmission in the drive train of a motor vehicle, using a shaft-hub connection provided with lengthwise teeth for releasable connection of a crankshaft with a coaxial hydrodynamic torque converter, wherein the lengthwise teeth of the shaft-hub connection have tooth cross sections that increase or decrease in the lengthwise direction of the teeth,
   wherein an axial force is used to secure the shaft-hub connection axially, said force resulting from the internal pressure of the converter when the torque converter is operating.

8. An assembly comprising:

an engine crankshaft;

a hydrodynamic torque converter disposed coaxially with respect to the crankshaft;

and a driving connection between the crankshaft and the torque converter;

wherein said driving connection is a shaft-hub connection with lengthwise teeth which are tapered in the lengthwise direction of the teeth.

9. An assembly according to claim 8, wherein an axial force is used to secure the shaft-hub connection axially, said force resulting from the internal pressure of the converter when the torque converter is operating.

10. An assembly according to claim 8, wherein the shaft and hub are connected together by an additional shapewise connection for securing the shaft-hub connection axially.

11. An assembly according to claim 10, wherein the additional shapewise connection includes a locking bolt.

12. An assembly according to claim 10, wherein the additional shapewise connection includes a tensioning spring.

13. A method of making an assembly for torque transmission in the drive train of an engine, comprising:

providing an engine crankshaft;

disposing a hydrodynamic torque converter coaxially with respect to the crankshaft; and providing a driving connection between the crankshaft and the torque converter, wherein said driving connection is a shaft-hub connection with lengthwise teeth which are tapered in the lengthwise direction of the teeth.

14. The method of making an assembly according to claim 13, further including the step of providing an axial force to secure the shaft-hub connection axially, said force resulting from the internal pressure of the converter when the torque converter is operating.

* * * * *